(12) United States Patent
Bao et al.

(10) Patent No.: US 9,629,040 B2
(45) Date of Patent: Apr. 18, 2017

(54) METHOD AND DEVICE FOR CONFIGURING DONOR BASE STATION OR DONOR CELL FOR MOBILE RELAY NODE

(75) Inventors: Wei Bao, Beijing (CN); Yali Zhao, Beijing (CN); Yi Yang, Beijing (CN); Guoqing Li, Beijing (CN)

(73) Assignee: Datang Mobile Communications Co., LTD, Beijing (CN)

( * ) Notice: Subject to any disclaimer, the term of this patent is extended or adjusted under 35 U.S.C. 154(b) by 213 days.

(21) Appl. No.: 13/984,907

(22) PCT Filed: Feb. 9, 2012

(86) PCT No.: PCT/CN2012/070997
§ 371 (c)(1),
(2), (4) Date: Aug. 12, 2013

(87) PCT Pub. No.: WO2012/106992
PCT Pub. Date: Aug. 16, 2012

(65) Prior Publication Data
US 2013/0329629 A1 Dec. 12, 2013

(30) Foreign Application Priority Data

Feb. 12, 2011 (CN) .......................... 2011 1 0036886

(51) Int. Cl.
*H04W 36/00* (2009.01)
*H04W 24/02* (2009.01)
(Continued)

(52) U.S. Cl.
CPC ........ *H04W 36/0083* (2013.01); *H04W 24/02* (2013.01); *H04W 36/08* (2013.01);
(Continued)

(58) Field of Classification Search
CPC . H04W 36/0083; H04W 40/22; H04W 88/04; H04W 88/08; H04W 36/32;
(Continued)

(56) References Cited

U.S. PATENT DOCUMENTS 8,538,325 B2* 9/2013 Gunnarsson .......... H04W 24/00
370/315
8,989,076 B2* 3/2015 Ishikawa ....................... 370/315
(Continued)

FOREIGN PATENT DOCUMENTS

CN 101150840 A 3/2008
CN 101365242 A 11/2009
(Continued)

OTHER PUBLICATIONS

International Search Report of PCT/CN2012/070997, mailed May 3, 2012.

*Primary Examiner* — Ahmed Elallam
(74) *Attorney, Agent, or Firm* — Oliff PLC

(57) ABSTRACT

Disclosed are a method and device for configuring a Donor base station or a Donor cell for a mobile relay node. The method includes: an operation administration and maintenance (OAM) system obtains position information about a mobile relay node (RN) and determines a standby Donor base station or a standby Donor cell which can be accessed by the mobile RN according to the position information thereof; and the OAM system indicates the standby Donor base station or the standby Donor cell to a serving Donor base station of the mobile RN or indicates the standby Donor base station or the standby Donor cell to the serving Donor base station of the mobile RN through the mobile RN, so that the serving Donor base station of the mobile RN selects a target Donor base station or a target Donor cell for the mobile RN. By way of the present invention, the DeNB or
(Continued)

the Donor Cell can be configured for the mobile RN when the mobile RN is moving.

17 Claims, 5 Drawing Sheets

(51) Int. Cl.
    *H04W 36/08*     (2009.01)
    *H04W 84/04*     (2009.01)
    *H04W 88/04*     (2009.01)
    *H04W 88/08*     (2009.01)
    *H04W 64/00*     (2009.01)
    *H04W 84/00*     (2009.01)

(52) U.S. Cl.
    CPC ........ *H04W 64/003* (2013.01); *H04W 84/005* (2013.01); *H04W 84/047* (2013.01); *H04W 88/04* (2013.01); *H04W 88/08* (2013.01)

(58) Field of Classification Search
    CPC ... H04W 40/20; H04W 40/38; H04W 84/047; H04W 24/02; H04W 36/08; H04W 64/00; H04W 64/003; H04W 64/006; H04W 88/182

See application file for complete search history.

(56) References Cited

U.S. PATENT DOCUMENTS

| | | | | |
|---|---|---|---|---|
| 2007/0249347 | A1* | 10/2007 | Saifullah et al. | 455/436 |
| 2009/0239466 | A1* | 9/2009 | Saitou et al. | 455/11.1 |
| 2011/0194483 | A1* | 8/2011 | Ji et al. | 370/315 |
| 2012/0002589 | A1* | 1/2012 | Saifullah et al. | 370/315 |
| 2012/0201229 | A1* | 8/2012 | Feng | H04W 72/0413 370/336 |
| 2012/0264368 | A1* | 10/2012 | Aminaka | H04B 7/155 455/9 |
| 2013/0040558 | A1* | 2/2013 | Kazmi | 455/9 |
| 2013/0059590 | A1* | 3/2013 | Teyeb et al. | 455/438 |
| 2015/0195757 | A1* | 7/2015 | Tietz | H04W 36/0061 455/438 |

FOREIGN PATENT DOCUMENTS

| | | |
|---|---|---|
| CN | 102098723 A | 6/2011 |
| WO | 2010056072 A2 | 5/2010 |

* cited by examiner

METHOD AND DEVICE FOR CONFIGURING DONOR BASE STATION OR DONOR CELL FOR MOBILE RELAY NODE

CROSS REFERENCE TO RELATED APPLICATIONS

This application is the National Stage of PCT/CN2012/070997 filed on Feb. 9, 2012, which claims priority under 35 U.S.C. §119 of Chinese Application No. CN 201110036886.1 filed on 12 Feb. 2011, the disclosures of which are incorporated by reference. The international application under PCT article 21(2) was not published in English.

FIELD OF THE PRESENT INVENTION

The present invention relates to communication field, in particular to a method and device for configuring donor base station or donor cell.

BACKGROUND OF THE PRESENT INVENTION

Relay technology as a cost-effective network coverage expansion mode is introduced into a mobile communication system. Meanwhile, its introduction also aims to improve the quality of mobile communication services in the high-speed mobile scene. After the introduction, the wireless communication network architecture is shown in FIG. 1. A RN (Relay Node) is connected wirelessly to a cell (named Donor Cell of the RN) dominated by the DeNB (Donor evolved Node B) and then to a core network through a wired network. A mobile RN has two wireless interfaces totally, namely an Un interface between the mobile RN and the DeNB and an Uu interface between the user terminal belonging to the mobile RN (R-UE) and the mobile RN. It provides such processing functions as reception, decoding, protocol conversion and data forwarding between the Un and Uu interfaces.

A mobile RN has the following characteristics:

(1) It is a network-side node and arranged, managed and maintained by the operator.

(2) It can be installed on vehicles to provide services for a user terminal in the vehicles.

It is static relative to the equipment which it services.

(3) From the perspective of the user terminal, a mobile RN is an ordinary base station.

It manages independent cells, has independent physical layer cell identifications and sends independent synchronous signals, reference marks, etc. User terminals belonging to the mobile RN directly receive scheduling and control signals from the RN and directly send uplink control and feedback information to it.

(4) From the perspective of the DeNB, a mobile RN is similar to a user terminal. It interchanges the data with a core network through the DeNB. Meanwhile; it needs to measure the quality of signals at the Un interface and hands over according to different measurement results among different DeNB/Donor Cells (namely DeNB or/and Donor Cell, similarly hereinafter).

Not all eNBs are suitable as the DeNB of a mobile RN. DeNB and Donor Cell shall be configured to the mobile RN in advance. As a network-side node, for a RN similar to a fixed position RN (hereinafter referred to as a fixed RN), Donor Cells of a mobile RN are configured by the operator through an OAM (Operation and Maintenance) system of the RN.

The boot process of a fixed RN can be divided into two stages:

Stage I: after RN startup, select a cell (unnecessarily the one supporting a RN), attach it to a network using the same attachment process as UE (User terminal), and then acquire initial configuration parameters, such as DeNB/Donor Cell list and other parameters from OAM. Not all eNBs (evolved Node B)/Cells are suitable as DeNB/Donor Cell of a RN. To let a RN know the DeNB/Donor Cell it accesses, it is necessary to configure DeNB/Donor Cell for the RN. After the configuration, the RN is deattached from the network with the same deattachment process as UE and triggers the operation at stage II.

Stage II: a RN node selects a proper DeNB/Donor Cell for access from the DeNB/Donor Cell list acquired at stage I. After a series of preparations (such as creating interfaces S1 and X2, connecting the OAM, creating user panel carriers, etc.), a RN begins to provide services for UE. When it begins the normal operation, unless shutdown or abnormalities (for example, RN restart or serious problems of the wireless link of an interface between RN and DeNB), it will always be connected, and its position and DeNB/Donor Cell will be unchanged.

In the procedure of realizing the objects of the present invention, at least the following problems existing in the current technologies were found:

The prior art takes that a RN is fixed as a precondition. Thus, the DeNB/Donor Cell of a RN is always the same. After introducing a mobile RN, it is necessary to hand over DeNB/Donor Cell frequently when the mobile RN is moving. However, based on the prior art, it fails to configure a new DeNB/Donor Cell which can be accessed for the mobile RN.

SUMMARY OF THE PRESENT INVENTION

The embodiments of the present invention aim to provide a method and device for configuring a Donor base station or a Donor cell for a mobile relay node to configure the DeNB/Donor Cell for the mobile RN when the mobile RN is moving. In this regard, the embodiments of the present invention adopt the following technical solutions:

A method and device for configuring a Donor base station or a Donor cell for a mobile relay node, which comprises:

An OAM system acquires position information about a mobile relay node and determines a standby Donor base station or a standby Donor cell which can be accessed by the mobile RN according to the position information thereof;

The OAM system indicates the standby Donor base station or the standby Donor cell to a serving Donor base station of the mobile RN or indicates the standby Donor base station or the standby Donor cell to the serving Donor base station of the mobile RN through the mobile RN, so that the serving Donor base station of the mobile RN selects a target Donor base station or a target Donor cell for the mobile RN.

An OAM system, which includes:

An acquiring module acquiring position information about a mobile RN;

A determination module determining a standby Donor base station or a standby Donor cell which can be accessed by the mobile RN according to the position information thereof acquired by the acquiring module;

A sending module indicating the standby Donor base station or the standby Donor cell determined by the determination module to the mobile RN or a serving Donor base station of the mobile RN.

A mobile RN, which includes:

A position reporting module reporting position information about the mobile RN to an OAM system;

A receiving module receiving the information about a standby Donor base station or a standby Donor cell determined by the OAM system according to position information about the mobile RN;

A sending module sending the information about the standby Donor base station or the standby Donor cell of the mobile RN to a serving Donor base station of the mobile RN.

A base station, which includes:

The first sending module sending the position of a mobile RN to an OAM system;

The first receiving module receiving the information about a standby Donor base station or a standby Donor cell of the mobile RN determined by the OAM system according to position information about the mobile RN;

A determination module determining a target Donor base station or a target Donor cell for the mobile RN according to the standby Donor base station or the standby Donor cell of the mobile RN received by the first receiving module.

A method and device for configuring a Donor base station or a Donor cell for a mobile relay node is to store the information about a standby Donor base station or a standby Donor cell which can be accessed on running lines stored on the RN and to arrange the Donor base station or the Donor cell as per the order of running lines of the mobile RN.

The method includes:

The mobile RN determines a standby Donor base station or a standby Donor cell which can be accessed by the mobile RN according to the current running information and the information about a Donor base station or a Donor cell which can be accessed on running lines of the mobile RN;

The mobile RN indicates the standby Donor base station or the standby Donor cell determined to a serving Donor base station of the mobile RN, so that the serving Donor base station of the mobile RN selects a target Donor base station or a target Donor cell for the mobile RN.

A mobile RN, wherein, comprising:

A memory module storing the information about a Donor base station or a Donor cell which can be accessed on running lines of the mobile RN, wherein, the Donor base station or the Donor cell is arranged the order of running lines of the mobile RN;

A determination module determining a standby Donor base station or a standby Donor cell which can be accessed by the mobile RN according to the current running information about the mobile RN and the information about a Donor base station or a Donor cell stored on running lines of the memory module;

An indication module indicating the standby Donor base station or the standby Donor cell determined by the determination module to a serving Donor base station of the mobile RN, so that the serving Donor base station of the mobile RN selects a target Donor base station or a target Donor cell for the mobile RN.

In the above embodiments of the present invention, an OAM system selects the DeNB/Donor Cell which can be accessed for a mobile RN according to position information or moving lines about the mobile RN, thus the DeNB/Donor Cell can be configured for the mobile RN when the mobile RN is moving.

DETAILED DESCRIPTION OF THE EMBODIMENTS OF THE PRESENT INVENTION

In the following parts, clear and complete descriptions of the technology solutions in embodiments of the present invention are made combined with drawings of the embodiments. It is clear that the embodiments described here are only parts of the embodiments of the present invention. According to the embodiments of the present invention, any other embodiments made by technical personnel of the field in the absence of creative work all belong to the scope of the patent protection of the invention.

Embodiment I

In the embodiment, the OAM of a mobile RN when it is moving can acquire the current position of the mobile RN, and determine an alternative DeNB/Donor Cell list and send it to a serving DeNB of the mobile RN according to the position thereof or send it to a serving DeNB of the mobile RN through the mobile RN, so that the serving DeNB selects a target DeNB/Donor Cell for the mobile RN according to the alternative DeNB/Donor Cell list.

In the above processes, actions at mobile RN side include:

A mobile RN reports its own position, for example, the ID information about the current Donor Cell or geographic location information (for example, positioning system measured by a GPS (Global Positioning System)); receives the OAM at OAM side, informs the current serving DeNB of a DeNB/Donor Cell list received according to a list of standby DeNB/Donor Cell determined based on the position of the mobile RN; and measures and reports according to measurement parameters configured by a DeNB.

Actions at OAM side include: search the DeNB/Donor Cell around a mobile RN according to the position information reported by the mobile RN, generate a list of standby DeNB/Donor Cell of the mobile RN and send it to the mobile RN or the DeNB of the mobile RN.

Actions at serving DeNB side of a mobile RN include:

Configure handover measurement parameters for the mobile RN and hand over a target DeNB/Donor Cell for the mobile RN according to a list of DeNB/Donor Cell reported by the mobile RN.

Figure 1:
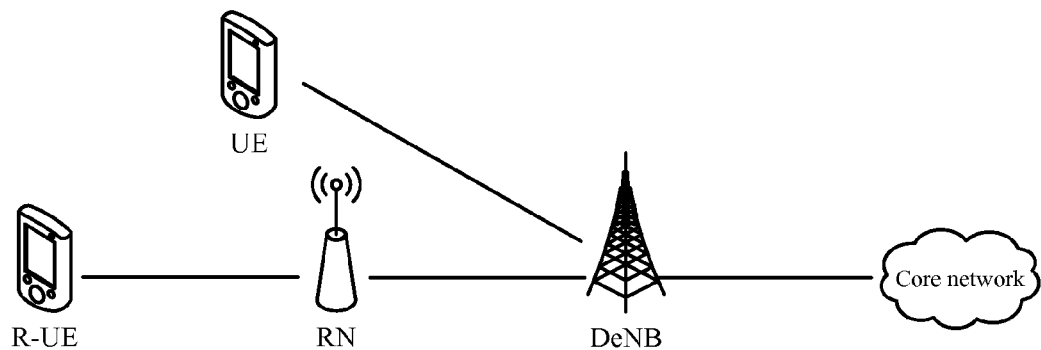
FIG. 1 is a schematic diagram of wireless communication network architecture in the prior art after Relay technology is introduced.
Figure 2:
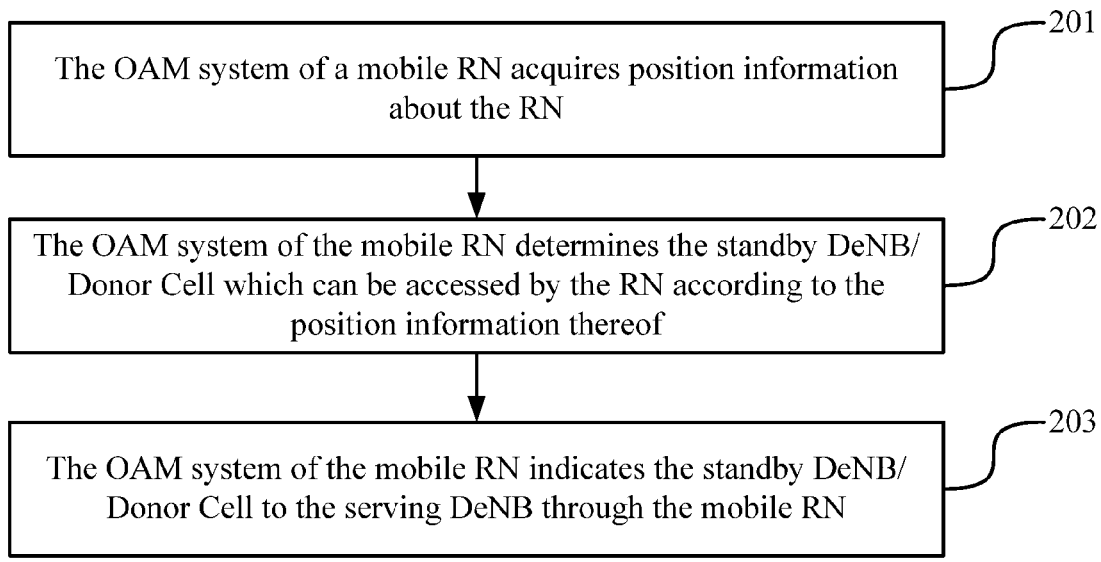
FIG. 2 is a flow diagram of a method for configuring the DeNB or Donor Cell for a mobile relay node provided in the embodiments of the present invention.

A flow diagram of configuring DeNB/Donor Cell for a mobile RN provided in the embodiments of the present invention is shown in FIG. 2, which comprises:

Step 201, an OAM system of a mobile RN acquires position information about the mobile RN.

To be specific, a mobile RN or its DeNB reports its position information to the OAM of an eNB and then the OAM informs the OAM of the mobile RN of the information. Position reporting processes under the above two conditions can be triggered by a period (period reporting intervals can be configured) or an event. If triggered by a period, the mobile RN can report its position information to its OAM at regular intervals or a serving DeNB of the mobile RN can report position information about the mobile RN to eNB OAM and then the eNB OAM informs OAM of the mobile RN of the information at regular intervals. If triggered by an event; the mobile RN can report its position information to the mobile RN OAM during handover or its target DeNB can report the information to eNB OAM and then the eNB OAM informs OAM of the mobile RN of it.

Therein, the position information about the mobile RN can be its geographic location information which can be acquired by a positioning device, for example GPS on the mobile RN or by positioning algorithm based on the mobile RN or on the current serving DeNB of the mobile RN; the information can also be such information as identification information or frequency point information about DeNB/Donor Cell belonging to the mobile RN which can uniquely identify the DeNB/Donor Cell; or it can be a combination of the above information.

Step 202, an OAM of a mobile RN determines a standby DeNB/Donor Cell which can be accessed by the mobile RN according to the position information thereof.

Firstly, the OAM system of the mobile RN can determine all eNBs/Cells conforming to certain conditions (for example, being close to the position of the RN) according to geographic location or DeNB/Donor Cell of the RN. As not all eNBs/Cells are suitable for DeNB/Donor Cell of the mobile RN, the suitable ones are selected among the all and the DeNB/Donor Cell selected finally is a standby DeNB/Donor Cell of the mobile RN.

Step 203, an OAM system of the mobile RN indicates the standby DeNB/Donor Cell to a serving DeNB of the mobile RN through the mobile RN.

To be specific, the mobile RN can indicate a standby DeNB/Donor Cell in an explicit or implicit way to a serving DeNB of the mobile RN. The explicit way means that the OAM system of the mobile RN can send identification information or frequency point information about the standby DeNB/Donor Cell to the serving DeNB of the mobile RN or send the information about the standby DeNB/Donor Cell to the serving DeNB of the mobile RN. The implicit way refers to that the OAM system of the mobile RN sends the information about the standby DeNB/Donor Cell to the mobile RN and then the mobile RN only reports measurement results of the standby DeNB/Donor Cell to its serving DeNB, so that the serving DeNB selects a target DeNB/Donor Cell handed over by the mobile RN from DeNB/Donor Cell in the measurement results.

After that, serving DeNB of the mobile RN can select the target DeNB/Donor Cell handed for the mobile RN according to the standby DeNB/Donor Cell thereof. Based on the prior art, the DeNB can select a handover target for the mobile RN by reference to cell measurement results reported by the mobile RN.

It can be seen from the above processes that the OAM system of the mobile RN selects a standby DeNB/Donor Cell which can be accessed by the mobile RN according to the position information thereof, so that the DeNB/Donor Cell can be configured for the mobile RN when the mobile RN is moving.

Embodiment II

In the embodiment of the present invention, when a mobile RN is accessed on a DeNB, the position of the mobile RN will be reported to the OAM of an eNB, and a standby DeNB/Donor Cell determined by the eNB according to the position of the mobile RN and sent to DeNB of the mobile RN, so that a serving DeNB of the mobile RN selects a target DeNB/Donor Cell for the mobile RN according a list of standby DeNB/Donor Cell thereof.

In the above processes, actions at mobile RN side include: a mobile RN measures and reports measurement results according to measurement parameters configured by DeNB. Optionally, if the information about a list of standby DeNB/Donor Cell is included among these parameters, the mobile RN can only measure a standby target cell indicated by the list of standby DeNB/Donor Cell. The information informed by DeNB of the mobile RN can be identification information, such as DeNB ID or Donor Cell ID of the standby DeNB/Donor Cell, characteristic information including cell frequency point information or the information combining the aforementioned two kinds of information.

Actions at OAM side of an eNB include determining a list of standby DeNB/Donor Cell and sending it to the DeNB of a mobile RN according to position information about the mobile RN reported by the DeNB.

Actions at serving DeNB side include configuring handover measurement parameters for a mobile RN. Optionally, when configuring measurement parameters, DeNB can inform the mobile RN of the information about a list of standby DeNB/Donor Cell to assist the measurement. For example, an indication mobile RN only needs to measure the DeNB/Donor Cell indicated in the list. The information informed by DeNB to the mobile RN can be identification information, such as DeNB ID or Donor Cell ID of the standby DeNB/Donor Cell, characteristic information, for example, cell frequency point information of the standby DeNB/Donor Cell or the information combining the aforementioned two kinds of information. The DeNB can select a handover target DeNB/Donor Cell for the mobile RN according to measurement results reported by the mobile RN and the information about the list of standby DeNB/Donor Cell.

Figure 3:
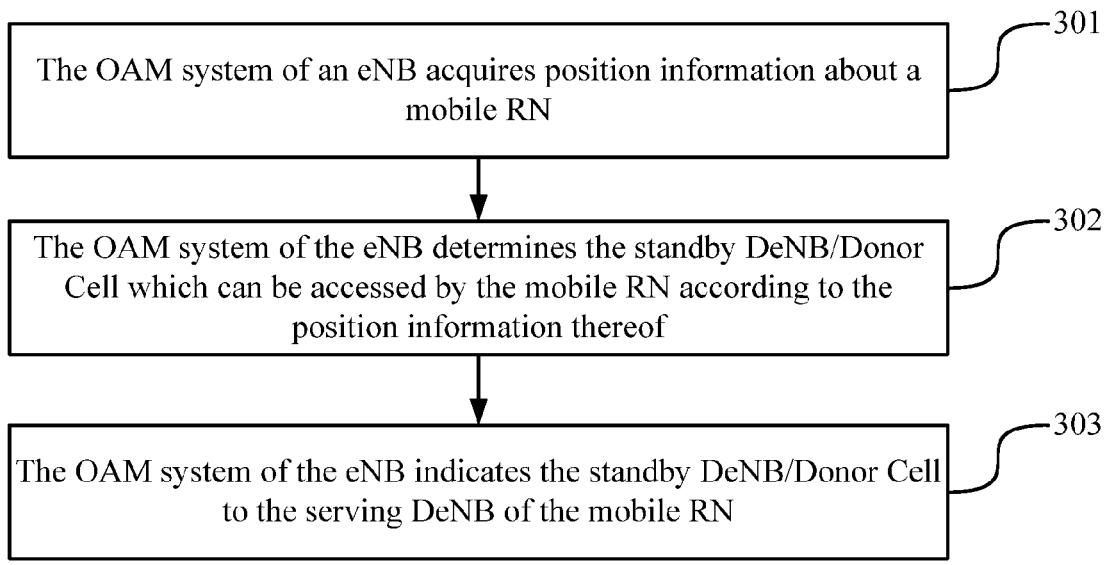
FIG. 3 is a flow diagram of a method for configuring the DeNB or Donor Cell for a mobile relay node provided in the embodiments of the present invention.

A flow diagram of configuring DeNB/Donor Cell for a mobile RN provided in the embodiments of the present invention is shown in FIG. 3, which includes:

Step 301, an OAM system of an eNB acquires position information about a mobile RN.

To be specific, the position information about the mobile RN can be reported by DeNB of the mobile RN to the OAM of the eNB. Position reporting processes can be triggered by a period (period reporting intervals can be configured) or an event. If triggered by a period, a serving DeNB of the mobile RN reports position information thereof to eNB OAM at regular intervals. If triggered by an event, the serving DeNB of the mobile RN reports the information to eNB OAM after the mobile RN finishes handing over.

Therein, the position information about the mobile RN can be its geographic location information or acquired by positioning algorithm based on the mobile RN or on the current serving DeNB of the mobile RN. The information can also be such information as identification information or frequency point information about DeNB/Donor Cell belonging to the mobile RN which can uniquely identify the DeNB/Donor Cell. Or it can be a combination of the above information.

Step 302, the OAM of the eNB determines a standby DeNB/Donor Cell which can be accessed by the mobile RN according to the position information thereof.

Step 303, the OAM system of the eNB indicates a standby DeNB/Donor Cell to a serving DeNB of the mobile RN.

To be specific, the OAM system can send identification information or frequency point information of the standby DeNB/Donor Cell to the serving DeNB of the mobile RN.

After that, the serving DeNB of the mobile RN can select a handover target DeNB/Donor Cell for the mobile RN according to the standby DeNB/Donor Cell thereof. Based on the prior art, the DeNB can select a handover target for the mobile RN by reference to cell measurement results reported by the mobile RN.

It can be seen from the above processes that the OAM system of the eNB selects a standby DeNB/Donor Cell which can be accessed by the mobile RN according to the position information thereof, so that the DeNB/Donor Cell can be configured for the mobile RN when the mobile RN is moving.

Embodiment III

In the embodiment of the present invention, an OAM system can send a list of all DeNBs/Donor cells passing when a mobile RN installed on vehicles with fixed lines is accessed to the mobile RN at one time, so that the mobile RN can select the accessible standby DeNB/Donor cell according to position information and the list of DeNBs/Donor cells, and then indicate the standby DeNB/Donor cell to a serving DeNB to enable the DeNB to select a handover target DeNB/Donor cell for the mobile RN.

In this process, actions at RN side include reporting running lines of the RN and acquiring a corresponding list of DeNB/Donor cell at stage I during access. At stage II, a list of standby DeNB/Donor cell is determined according to current DeNB/Donor cell, running direction information and the list of DeNB/Donor Cell acquired at stage I and the determined list of standby DeNB/Donor cell is informed to the current serving DeNB.

Actions at OAM side include generating a corresponding list of DeNB/Donor cell and sending it to a mobile RN according to information about running lines thereof.

Actions at serving DeNB side include selecting a handover target DeNB/Donor Cell for a mobile RN according to the information about a list of standby DeNB/Donor Cell reported by the mobile RN.

Figure 4:
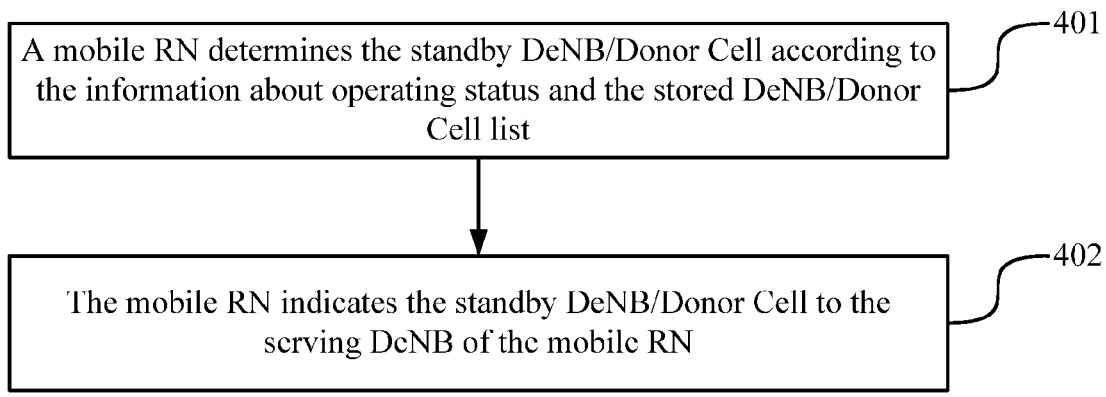
FIG. 4 a flow diagram of a method for configuring the DeNB or Donor Cell for a mobile relay node provided in the embodiments of the present invention.

A flow diagram of configuring DeNB/Donor Cell for a mobile RN provided in the embodiments of the present invention is shown in FIG. 4. A list of DeNB/Donor Cell which can be accessed on running lines of the mobile RN is stored on the mobile RN and DeNB/Donor Cell in the list arranged according to running lines of the mobile RN.

As shown in FIG. 4, the process includes:

Step 401, the mobile RN determines a standby DeNB/Donor Cell according to running status and other information as well as a list of stored DeNB/Donor Cell.

To be specific, the mobile RN can determine a standby DeNB/Donor Cell according to the current serving DeNB/Donor Cell of the mobile RN and a list of stored accessible DeNB/Donor Cell arranged according to movement lines of the mobile RN. For example, it can select several DeNB/Donor Cells before and after the current serving DeNB/Donor Cell as the standby DeNB/Donor Cell according to a list of accessible DeNB/Donor Cell. It can also determine a standby DeNB/Donor Cell according to the current serving DeNB/Donor Cell of the mobile RN, running direction and a list of stored accessible DeNB/Donor Cell arranged according to movement lines of the mobile RN. To be specific, it can select a or several DeNBs/Donor Cells next to the current serving DeNB/Donor Cell as the standby DeNB/Donor Cell in the list of stored accessible DeNB/Donor Cell arranged according to movement lines of the mobile RN. Step 402, the mobile RN indicates the standby DeNB/Donor Cell to a serving DeNB of the mobile RN.

To be specific, the mobile RN can indicate a standby DeNB/Donor Cell in an explicit or implicit way to a serving DeNB of the mobile RN. The explicit way means that the mobile RN can send identification information or frequency point information about the standby DeNB/Donor Cell to the serving DeNB of the mobile RN or send the information about the standby DeNB/Donor Cell to the serving DeNB of the mobile RN. The implicit way refers to that the mobile RN only sends measurement results of the standby DeNB/Donor Cell to its serving DeNB, so that the serving DeNB selects a target DeNB/Donor Cell handed over by the mobile RN from DeNB/Donor Cell in the measurement results.

After that, the serving DeNB of the mobile RN can select a handover target DeNB/Donor Cell for the mobile RN according to the standby DeNB/Donor Cell thereof. Based on the prior art, the DeNB can select a handover target for the mobile RN by reference to cell measurement results reported by the mobile RN.

In the above processes, another alternative to configure in advance a list of DeNB/Donor Cell corresponding to running lines of the mobile RN on the mobile RN is to manually store the list in the mobile RN.

It can be seen from the above processes that the OAM system determines a DeNB/Donor Cell which can be accessed on the way for the mobile RN according to the running lines thereof, and then the mobile RN determines a standby DeNB/Donor Cell according to the position and the DeNB/Donor Cell which can be accessed on the way of the mobile RN, so that the DeNB/Donor Cell can be configured for the mobile RN when the mobile RN is moving.

Embodiment IV

For embodiments I, II or III, a standby DeNB/Donor Cell of a mobile RN can be informed to the handover target DeNB of the mobile RN after acquiring the standby DeNB/Donor Cell on a serving DeNB of the mobile RN when the mobile RN switches over a DeNB/Donor Cell.

To be specific, the serving DeNB can send the above notice through interfaces X2 or S1 to a target DeNB. The interfaces X2 or S1 will be introduced briefly below.

During actual deployment of a network, for the base station application environment in an LTE (Long Term Evolution) system and in the implementation scheme of an eNB (Evolved Node B), X2 link is between two eNBs and S1 link is between an eNB and an MME (Mobility Management Entity)/S-GW (Serving Gateway). Meanwhile, both the X2 link and S1 link adopt a SCTP (Stream Control Transmission Protocol).

X2 link is between two eNBs and S1 link is between an eNB and an MME/S-GW. The S1 link provides wireless resources for access to the wireless access network, including plane control function and user plane function. The control panel interface of the S1 link (S1-MME) provides the application protocol between an eNB and an MME as well as signal carrying function for transmitting application protocol messages. The user plane interface of the S1 link (S1-U) provides the user plane data transmission function between an eNB and an S-GW. The X2 link mainly aims to support the mobility management function of UE under LTE-ACTIVE state; besides, the main functions of the X2 link include load management; cell interference coordination; ordinary X2 management & error control, etc.

A serving DeNB can directly send the identification information or characteristic information of a standby DeNB/Donor Cell through the interface X2 using X2-AP (Application Protocol) messages to a target DeNB. For example, HANDOVER REQUEST messages among X2-AP messages can be used, that is to say, they can be expanded to carry the identification information or characteristic information of the standby DeNB/Donor Cell.

The interface S1 can also be used. If there is no interface X2 or it is unavailable, the serving DeNB can send the identification information or characteristic information of the standby DeNB/Donor Cell through the interface S1 using S1-AP messages (for example) HANDOVER REQUARE to an MME and then the MME forwards the information using the S1-AP messages to a target DeNB. For example, HANDOVER REQUEST messages among the S1-AP messages can be used, that is to say, they are expanded to carry the identification information or characteristic information of the standby DeNB/Donor Cell.

In the actual operation, there will be a condition that a mobile RN needs to perform the next handover immediately after being handed over to a target DeNB. In the embodiment of the present invention, the mobile RN will perform the next handover when it has no enough time to report a list of DeNB/Donor Cell immediately after being handed over to a target DeNB. At this time, if the list is stored in the target DeNB, the list will help it to select a target cell.

Embodiment V

Figure 5:
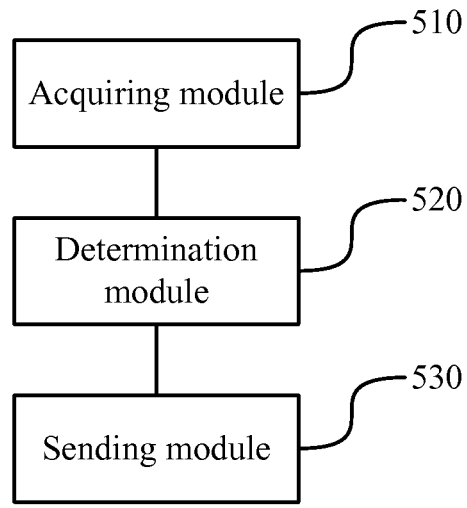
FIG. 5 is a structure diagram of an OAM system provided in the embodiments of the present invention.

The embodiment of the present invention provides an OAM system which can be applied to the processes in the aforementioned embodiments I, II and IV. As shown in FIG. 5, the OAM system includes:

An acquiring module 510 acquiring position information about a mobile RN;

A determination module 520 determining a standby DeNB or a standby Donor Cell which can be accessed by the mobile RN according to the position information thereof acquired by the acquiring module 510;

A sending module 530 indicating the standby DeNB or the standby Donor Cell determined by the determination module 520 to the mobile RN or a serving DeNB thereof.

Preferably, the OAM system is the one of the mobile RN;

The acquiring module 510 is specially used for receiving the position information reported by the mobile RN or the position information about the mobile RN acquired and sent by the OAM system of a base station from a serving Donor base station of the mobile RN.

Figure 6:
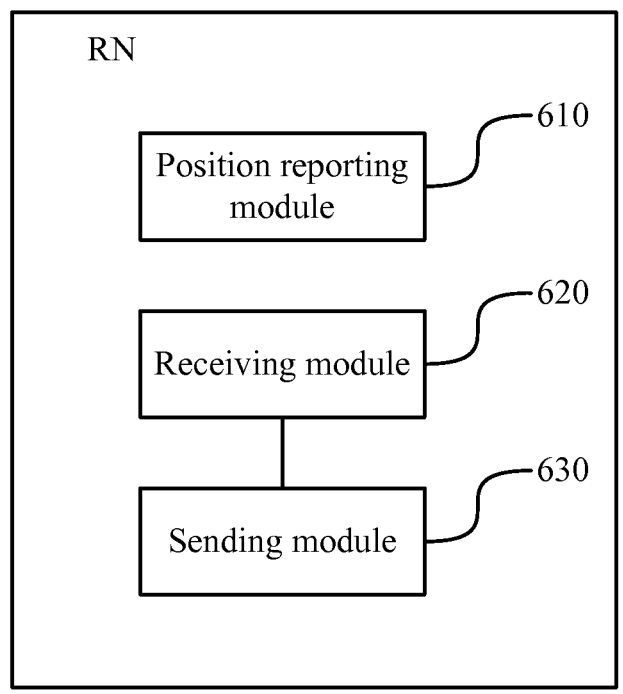
FIG. 6 is a structure diagram of a RN provided in the embodiments of the present invention.

The embodiment of the present invention also provides a mobile RN which can be applied to the processes in the aforementioned embodiments I, II and IV. As shown in FIG. 6, the RN includes:

A position reporting module 610 reporting position information of the mobile RN to an OAM system;

A receiving module 620 receiving the information about a standby Donor base station or a standby Donor cell determined by the OAM system according to the position information of the mobile RN;

A sending module 630 sending the standby Donor base station or the standby Donor cell of the mobile RN to a serving Donor base station thereof.

Preferably, the position reporting module 610 is specifically used for reporting its position information periodically to an OAM system of the mobile RN or after being handed over to a target Donor base station or a target Donor cell.

Preferably, the position reporting module 610 is specifically used for sending the information about the standby Donor base station or the standby Donor cell to a serving Donor base station of the RN or sending measurement results of the standby Donor base station or the standby Donor cell in the measurement results of a base station or a cell to the serving Donor base station of the RN.

Figure 7:
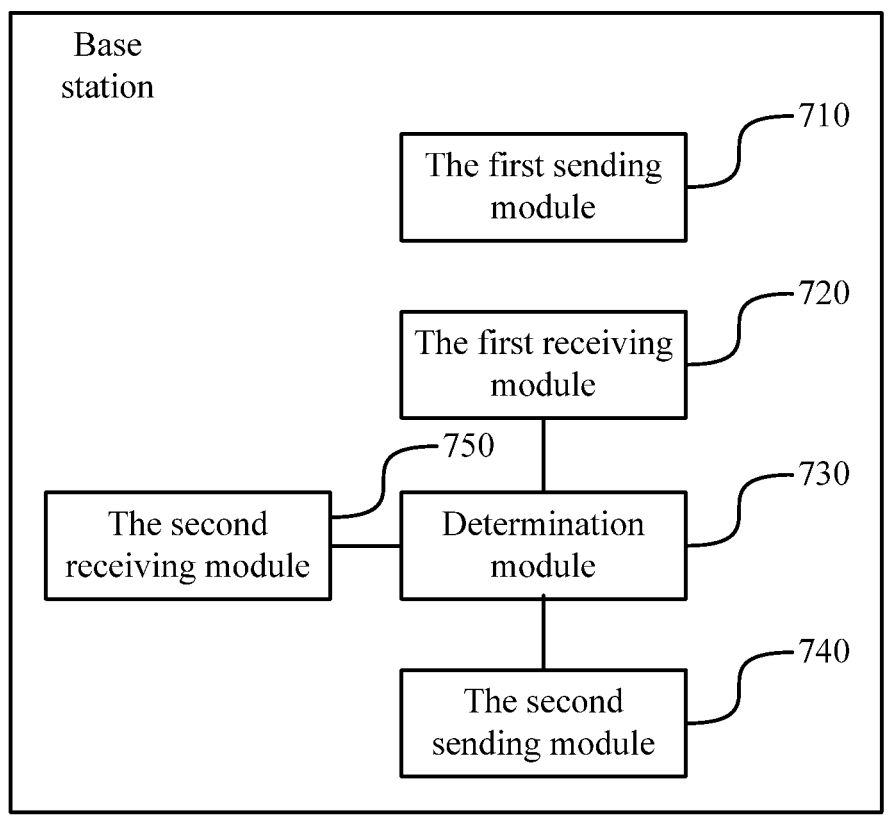
FIG. 7 is a structure diagram of a base station provided in the embodiments of the present invention.

The embodiment of the present invention also provides a base station, which can be applied to the processes in the aforementioned embodiments I, II and IV. As shown in FIG. 7, the base station includes:

The first sending module 710 sending position information about a mobile RN to an OAM system;

The first receiving module 720 receiving the information about a standby Donor base station or a standby Donor cell determined by the OAM system according to the position information of the mobile RN;

A determination module 730 determining a target Donor base station or a target Donor cell for the mobile RN according to the standby Donor base station or the standby Donor cell thereof received by the first receiving module 720.

Preferably, the first receiving module 720 is specifically used for sending the position information of the mobile RN periodically to an OAM system or when the mobile RN is handed over to the base station.

Preferably, the first receiving module 720 is specifically used for receiving the information about the standby Donor base station or the standby Donor cell of the mobile RN from an OAM system or from the mobile RN.

Preferably, the base station also includes:

The second sending module 740 sending the information about a standby Donor base station or a standby Donor cell of the mobile RN to a target Donor base station after determining the target Donor base station or a target Donor cell;

The second receiving module 750 receiving the information about the standby Donor base station or the standby Donor of a mobile RN sent by a source base station thereof after the base station is determined by the source base station of the mobile RN as a handover target Donor base station thereof.

Preferably, the second sending module 740 is specifically used for sending the information about the standby Donor base station or the standby Donor to a target Donor base station through the interface X2 or to a core network device through the interface S1;

The second receiving module 750 is specifically used for receiving the information about the standby Donor base station or the standby Donor of the mobile RN from the source base station thereof through the interface X2 or receiving the information about the standby Donor base station or the standby Donor forwarded by the core network device using the interface S1.

In the above embodiment of the present invention, an OAM system selects a standby DeNB/Donor Cell which can be accessed for a mobile RN according to the position information thereof, so that the DeNB/Donor Cell can be configured for the mobile RN when the mobile RN is moving.

Embodiment VI

Figure 8:
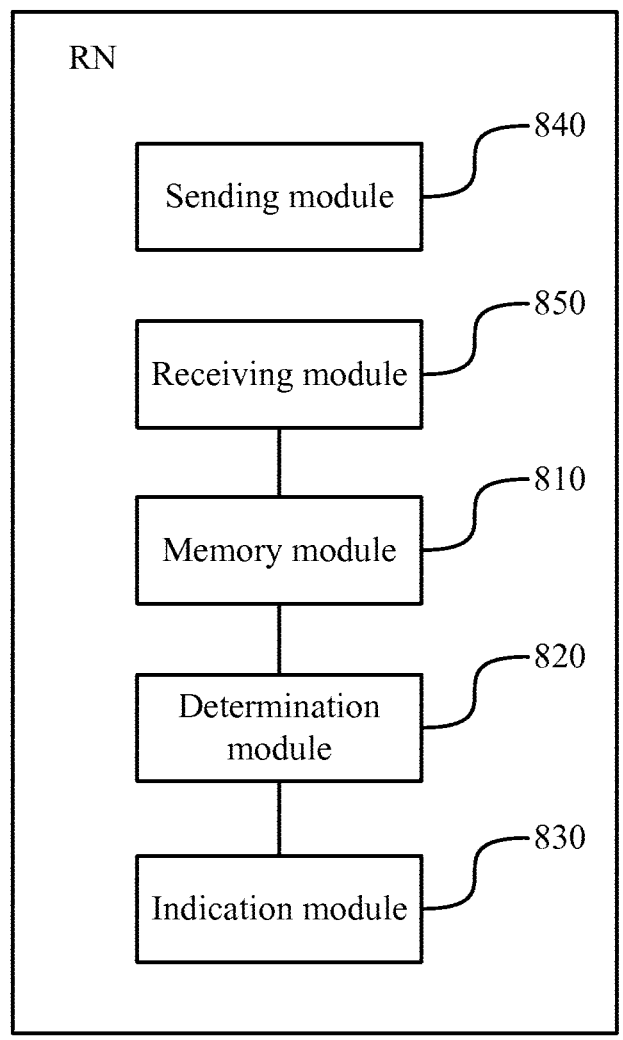
FIG. 8 a structure diagram of a RN provided in the embodiments of the present invention.

The embodiment of the present invention also provides a mobile RN which can be applied to the processes in the aforementioned embodiments III and IV. As shown in FIG. 8, the mobile RN includes:

A memory module 810 storing the information about a Donor base station or a Donor cell which can be accessed on running lines of the mobile RN, wherein, the Donor base station or the Donor cell is arranged as per the order of running lines of the mobile RN;

A determination module 820 determining a standby Donor base station or a standby Donor cell of the mobile RN according to current running information thereof and the information about the Donor base station or the Donor cell which can be accessed on running lines stored by the memory module 810;

An indication module 830 indicating the standby Donor base station or the standby Donor cell determined by the determination module 820 to a serving Donor base station of the mobile RN, so that the serving Donor base station can select a target Donor base station or a target Donor cell for the mobile RN.

Preferably, the determination module 820 is specifically used for determining a standby Donor base station or a standby Donor cell of the mobile RN according to a serving Donor base station or a Donor cell thereof, running direction thereof and the information about a Donor base station or a Donor cell which can be accessed on running lines stored by the memory module 810.

Preferably, the indication module 830 is specifically used for sending the information about the standby Donor base station or the standby Donor cell to a serving Donor base station of the mobile RN or sending measurement results of the standby Donor base station or the standby Donor cell among the measurement results of a base station or a cell to a serving Donor base station to the RN.

Preferably, the RN also includes:

A sending module 840 reporting the information about running lines of the mobile RN when it is accessed to an OAM system;

A receiving module 850 receiving the information about a Donor base station or a Donor cell which can be accessed on corresponding running lines determined and sent by the OAM system according to the information about running lines reported by the mobile RN and storing it in the memory module 810.

It can be seen from the above devices that an OAM system determines a DeNB/Donor Cell which can be accessed on the way according to running lines of a mobile RN and then the mobile RN determines a standby DeNB/Donor Cell according to the position and the DeNB/Donor Cell which can be accessed on the way of the mobile RN, so that the DeNB/Donor Cell can be configured for the mobile RN when the mobile RN is moving.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

Through the description of the embodiments above, the technical personnel in this field can understand clearly that the present invention can be implemented by software and necessary general hardware platform or hardware (the former is better in most cases). Based on this understanding, the technical program or the part making contributions to the prior art of the present invention can be embodied by a form of software products essentially which can be stored in a storage medium, including a number of instructions for making a computer device (such as cellphones, personal computers, servers, or network equipments, etc.) implement the methods described in the embodiments of the present invention.

The descriptions above are just preferred implement ways of the present invention. It should be pointed that, for general technical personnel in this field, some improvement and decorating can be done, which should be as the protection scope of the present invention.

The invention claimed is:

1. A method for configuring a Donor base station or a base station within a Donor cell for a mobile relay node (RN), the method comprising:
   acquiring, by a processor of an Operation and Maintenance (OAM) system, position information about the mobile RN;
   determining, by the processor of the OAM system, a standby Donor base station or a standby Donor cell that is accessible by the mobile RN according to the acquired position information;
   indicating, by the processor of the OAM system via a network, the determined standby Donor base station or the determined standby Donor cell to a serving Donor base station of the mobile RN or causing, by the processor of the OAM system, the mobile RN to indicate, via the network, the determined standby Donor base station or the standby Donor cell to the serving Donor base station; and
   selecting, by a processor of the serving Donor base station, a handover target Donor base station for the mobile RN from among the standby Donor base station or base stations of the standby Donor cell.

2. The method according to claim 1, wherein
   the OAM system is an OAM system of the mobile RN; and
   the method further comprises:
   reporting, by the mobile RN, the acquired position information to the processor of the OAM system of the mobile RN, or
   sending, by the serving base station of the mobile RN, the position information to the processor of the OAM system.

3. The method according to claim 2, further comprising
   periodically reporting, by the mobile RN, the position information of the mobile RN to the processor of the OAM system, or
   after the mobile RN is handed over to the target Donor base station:
   periodically reporting, by the serving Donor base station, the position information of the mobile RN to the processor of the OAM system, or
   periodically reporting, by the target Donor base station, the position information of the mobile RN to the processor of the OAM system.

4. The method according to claim 1, wherein
   the OAM system is an OAM system of the serving Donor base station, and
   the method further comprises:
   reporting, by the serving Donor base station of the mobile RN, the position information of the mobile RN to the processor of the OAM system of the serving Donor base station.

5. The method according to claim 4, wherein the serving Donor base station of the mobile RN reports the position information of the mobile RN to the processor of the OAM system of the serving Donor base station, and the method further comprises:
periodically sending, by the serving Donor base station of the mobile RN, the position information of the mobile RN to the processor of the OAM system of the serving Donor base station; or
after the mobile RN is handed over to the target Donor base station, sending, by the target Donor base station, the position information of the mobile RN to an OAM system of the target Donor base station.

6. The method according to claim 1, further comprising sending, by the processor of the OAM system, information about the determined standby Donor base station or the determined standby Donor cell to the mobile RN, and then sending, by the mobile RN, the information about the determine standby Donor base station or the determined standby Donor cell to a serving Donor base station; or
sending, by the processor of the OAM system, the information about the determined standby Donor base station or the determined standby Donor cell to the mobile RN, and then sending, by the mobile RN, signal quality measurement results of the determined standby Donor base station or the determined standby Donor cell among signal quality measurement results of all base stations or cells to the serving Donor base station of the mobile RN.

7. The method according to claim 1, further comprising: after the serving Donor base station of the mobile RN receives the indication about the determined standby Donor base station or the determined standby Donor cell, indicating, by the serving Donor base station of the mobile RN, the mobile RN to report the signal quality measurement results of the determined standby Donor base station or the determined standby Donor cell.

8. The method according to claim 1, further comprising, after the serving Donor base station of the mobile RN selects the target Donor base station for the mobile RN, sending, by the serving Donor base station of the mobile RN, information about the determined standby Donor base station or the determined standby Donor cell to the target Donor base station.

9. The method according to claim 8, wherein
the serving Donor base station of the mobile RN sends the information about the determined standby Donor base station or the determined standby Donor cell to the target Donor base station through an interface X2; or
the serving Donor base station of the mobile RN sends the information about the determined standby Donor base station or the determined standby Donor cell to a core network device and then the core network device sends such information to the target Donor base station through an interface S1.

10. The method according to claim 9, wherein
the serving Donor base station of the mobile RN sends the information about the determined standby Donor base station or the determined standby Donor cell to the target Donor base station through a first kind of handover request message through the interface X2; or
the serving Donor base station of the mobile RN sends the information about the determined standby Donor base station or the determined standby Donor cell to the core network device through a second kind of handover request message through the interface S1, and then the device sends such information to the target Donor base station through the second kind of handover request message through the interface S1.

11. The method according to claim 1, wherein the position information of the mobile RN includes at least one of: geographic location information, identification information, and frequency point information.

12. An Operation and Maintenance (OAM) system, comprising:
a processor programmed to:
acquire position information of a mobile relay node (RN);
determine a standby Donor base station or a standby Donor cell that are accessible by the mobile RN according to the acquired position information; and
indicate the determined standby Donor base station or the determined standby Donor cell to the mobile RN or a serving Donor base station of the mobile RN.

13. The OAM system according claim 12, wherein
the OAM system is an OAM system of the mobile RN; and
the processor is further programmed to:
receive the position information of the mobile RN from the mobile RN or from an OAM system of the serving Donor base station of the mobile RN.

14. A method for configuring a Donor base station or a base station within a Donor cell for a mobile relay node (RN), comprising:
storing, by the mobile RN, information about a Donor base station or a Donor cell that is accessible on moving lines, wherein the Donor base station or the Donor cell is arranged as per an order of the moving lines of the mobile RN;
determining, by the mobile RN, a standby Donor base station or a standby Donor cell that is currently accessible by the mobile RN according to current moving information and the stored information about the Donor base station or Donor cell that is currently accessible on moving lines;
indicating by, the mobile RN, the determined standby Donor base station or the standby Donor cell to a serving Donor base station of the mobile RN, so that the serving Donor base station selects a target Donor base station from among the determined standby Donor base station or the determined standby Donor cell.

15. The method according to claim 14, wherein
the mobile RN determines the standby Donor base station or the standby Donor cell of the mobile RN according to the serving Donor base station or a Donor cell of the mobile RN, a moving direction of the mobile RN and the stored information about the Donor base station or the Donor cell that is currently accessible on the moving lines.

16. The method according to claim 14, wherein the mobile RN indicating the determined standby Donor base station or the determined standby Donor cell to the serving Donor base station of the mobile RN includes:
the mobile RN sending the information about the determined standby Donor base station or the determined standby Donor cell to the serving Donor base station of the mobile RN; or
the mobile RN sending signal quality measurement results of the determined standby Donor base station or the determined standby Donor cell among the signal quality measurement results all base stations or cells to the serving Donor base station of the mobile RN.

17. The method according to claim 14, wherein the stored information about the Donor base station or the Donor cell that is currently accessible on the moving lines of the mobile RN is stored in the mobile RN when:
- the mobile RN reports information about the moving lines when the mobile RN is accessed, and/or
- an OAM system determines the information about the Donor base station or the Donor cell that is accessible based on corresponding moving lines.

* * * * *

UNITED STATES PATENT AND TRADEMARK OFFICE
CERTIFICATE OF CORRECTION

PATENT NO. : 9,629,040 B2
APPLICATION NO. : 13/984907
DATED : April 18, 2017
INVENTOR(S) : Wei Bao et al.

Page 1 of 1

It is certified that error appears in the above-identified patent and that said Letters Patent is hereby corrected as shown below:

On the Title Page

Item (73), please change "DATANG MOBILE COMMUNICATIONS CO., LTD." to --DATANG MOBILE COMMUNICATIONS EQUIPMENT CO., LTD.--

Signed and Sealed this
Tenth Day of April, 2018

Andrei Iancu
*Director of the United States Patent and Trademark Office*